(12) United States Patent
McGrew

(10) Patent No.: US 6,692,031 B2
(45) Date of Patent: * Feb. 17, 2004

(54) QUANTUM DOT SECURITY DEVICE AND METHOD

(76) Inventor: Stephen P. McGrew, 9715 W. Sunset Hwy., Spokane, WA (US) 99224

(*) Notice: Subject to any disclaimer, the term of this patent is extended or adjusted under 35 U.S.C. 154(b) by 0 days.

This patent is subject to a terminal disclaimer.

(21) Appl. No.: 09/955,808
(22) Filed: Sep. 18, 2001

(65) Prior Publication Data

US 2002/0021003 A1 Feb. 21, 2002

Related U.S. Application Data (63) Continuation of application No. 09/224,938, filed on Dec. 31, 1998, now abandoned.

(51) Int. Cl.⁷ .............................................. B42D 15/00
(52) U.S. Cl. ........................ 283/93; 283/57; 283/72; 283/81; 283/901; 382/116; 382/135; 399/16; D19/11
(58) Field of Search ............................ 283/87, 72, 91, 283/92, 93, 901, 57–59; 382/116, 135, 137, 191; 399/15, 16, 17, 47; D19/11

(56) References Cited

U.S. PATENT DOCUMENTS

| | | | |
|---|---|---|---|
| 4,014,602 A | 3/1977 | Ruell | 350/3.5 |
| 4,351,547 A | 9/1982 | Brooks, II | 283/8 R |
| 4,442,170 A | 4/1984 | Kaule et al. | 428/333 |
| 4,589,686 A * | 5/1986 | McGrew | 283/85 |
| 5,003,915 A * | 4/1991 | D'Amato et al. | 118/46 |
| 5,171,040 A | 12/1992 | Orndorff | 283/93 |
| 5,244,828 A | 9/1993 | Okada et al. | 437/81 |
| 5,260,957 A * | 11/1993 | Hakimi et al. | 372/39 |
| 5,342,672 A * | 8/1994 | Killey | 428/195 |
| 5,396,559 A * | 3/1995 | McGrew | 380/54 |
| 5,636,874 A | 6/1997 | Singer | 283/94 |
| 5,772,250 A | 6/1998 | Gasper | 283/114 |
| 5,831,329 A * | 11/1998 | Marso et al. | 257/329 |
| 5,855,989 A | 1/1999 | Mantegazza | 428/195 |
| 5,882,779 A * | 3/1999 | Lawandy | 257/102 |
| 5,969,863 A | 10/1999 | Staub et al. | 359/567 |
| 5,974,140 A | 10/1999 | Tanaka | 380/4 |
| 6,001,516 A | 12/1999 | Gasper | 430/10 |
| 6,107,038 A * | 8/2000 | Choudhary et al. | 204/450 |
| 6,263,104 B1 * | 7/2001 | McGrew | 382/210 |
| 6,535,638 B2 * | 3/2003 | McGrew | 382/210 |
| 2002/0021003 A1 * | 2/2002 | McGrew | 283/93 |
| 2002/0031266 A1 * | 3/2002 | McGrew | 382/210 |

FOREIGN PATENT DOCUMENTS

EP  0 328 202 A2  8/1989

OTHER PUBLICATIONS

Bruchez, Jr., Marcel et al., "Semiconductor Nanocrystals as Fluorescent Biological Labels", Science Magazine, vol. 281, No. 5385, Sep. 25, 1998, pp. 2013–2016.

Chan, Warren C.W., et al., "Quantum Dot Bioconjugates for Ultrasensitive Nonisotopic Detection", Science Magazine, vol. 281, No. 5385, Sep. 25, 1998, pp. 2016–2018.

\* cited by examiner

*Primary Examiner*—Monica Carter
(74) *Attorney, Agent, or Firm*—Dorsey & Whitney LLP (57) ABSTRACT

Quantum dots are used as fluorescent taggants in security inks, papers, plastics, explosives, or any other item or substance in which it is desired to provide a distinct signature or marking. Quantum dots of specific sizes, compositions and structures may be used to produce specific fluorescence, mixtures of quantum dots can be used to produce random patterns of spectrally varying fluorescence, and particular quantum dot structures can be used to provide desirable physical and optical properties. The quantum dots may be read with an optical reader, which may be combined with readers using other technologies.

9 Claims, 5 Drawing Sheets

Fig. 7

QUANTUM DOT SECURITY DEVICE AND METHOD

This is a continuation of pending U.S. patent application Ser. No. 09/224.938, filed Dec. 31, 1998 now abandoned. This is also related to U.S. Pat. No. 6,263,104 entitled "METHOD AND APPARATUS FOR READING AND VERIFYING HOLOGRAMS", which is incorporated herein by reference.

TECHNICAL FIELD

The present invention relates quantum dots, and more particularly to the use of quantum dots for security applications.

BACKGROUND OF THE INVENTION

Quantum dots, including their optical and physical properties and methods of manufacture, are well known and described in the following publications:

1. Warren C. W. Chan, Shuming Nie, "Quantum Dot Bioconjugates for Ultrasensitive Nonisotopic Detection", Science 281 (5385):2016
2. Marcel Burchez Jr., Mario Moronne, Peter Gin, Shimon Weiss, A. Paul Alivisatos, "Semiconductor nanocrystals as Fluorescent Biological Labels", 281 (5385):2013
3. L. E. Brus, Applied Physics A 53, 465 (1991)
4. W. L. Wilson, P. F. Szajowski, L. E. Brus, Science 262, 1242 (1993)
5. A. Henglein, Chem. Rev. 89, 1861 (1989)
6. H. Weller, Angew. Chem. Int. Ed. Engl. 32, 41 (1993)
7. M. A. Hines and P. Guyot-Sionnest, J. Phys. Chem. 100, 468 (1996)
8. B. O. Dabbousi, et al., J. Phys. Chem. B 101, 9463 (1997)
9. C. B. Murray, D. J. Norris, M. G. Bawendi, J. Am. Chem. Soc. 115,8706 (1993)
10. X. G. Peng, J. Wickham, A. P. Alivasatos, J. Am. Chem. Soc. 120,5343 (1998)
11. L. M. Lizmarzan, M. Giersig, P. Mulvaney, Langmuir 12, 4329 (1996)
12. M. A. CorreaDuarte, M. Giersig, L. M. LizMarzan, Chem. Phys. Lett. 286,497 (1998)
13. Marcel Bruchez Jr., Mario Moronne, Peter Gin, Shimon Weiss, and A. Paul Alivisatos, "Semiconductor Nanocrystals as Fluorescent Biological Labels" Science 1998 September 25;281:2013–2016.
14. Warren C. W. Chan and Shuming Nie, "Quantum Dot Bioconjugates for Ultrasensitive Nonisotopic Detection" Science 1998 September 25;281:2016–2018.

The above publications describe methods for making quantum dots such as nanometer-sized crystals of CdSe—CdS and ZnS-capped CdSe. The publications also describe physical and optical properties of these quantum dots. In particular, the publication by Chan et al (Publication 1) and in the publication by Burchez Jr., et al (Publication 2), describe quantum dots having the following fluorescence properties:

high fluorescence intensity, comparable to 20 molecules of Rhodamine 6G;

emission spectra one-third as wide as a typical organic dye-tagged latex sphere;

100 times lower photobleaching rate than typical organic dyes;

a long fluorescence lifetime, on the order of hundreds of nanoseconds.

fluorescence spectrum peak closely correlated to quantum dot diameter

As described at 2016-18 in the above-cited treatise by Chan and Nie, molecular conjugates of luminescent quantum dots are expected to offer substantial advantages over organic dyes. The properties of quantum dots result from quantum-size confinement, which occurs when metal and semiconductor particles are smaller than their exciton Bohr radii (about 1 to 5 nm) (2–4). Recent advances have resulted in the large-scale preparation of relatively monodisperse quantum dots (5–7), the characterization of their lattice structures (4), and the fabrication of quantum dots arrays (8–12) and light-emitting diodes (13, 14). For example, CdSe quantum dots passivated with a ZnS layer are strongly luminescent (35 to 50% quantum yield) at room temperature, and their emission wavelength can be tuned from the blue to the red wavelengths by changing the particle size (7, 15).

SUMMARY OF THE INVENTION

According to one aspect of this invention, quantum dots are used as fluorescent taggants in security inks, papers, plastics, explosives, or any other item or substance in which it is desired to provide a distinct signature or marking. Quantum dots are superior to standard fluorophores in this application because of their controllable fluorescence peak color, their characteristic narrow fluorescence spectra, their characteristically long fluorescence lifetimes, and the ability to make their fluorescence properties essentially independent of their immediate environment. Quantum dots of specific sizes, compositions and structures may be used to produce specific fluorescence, mixtures of quantum dots can be used to produce random patterns of spectrally varying fluorescence, and particular quantum dot structures can be used to provide desirable physical and optical properties.

DETAILED DESCRIPTION OF THE INVENTION

Figure 1:
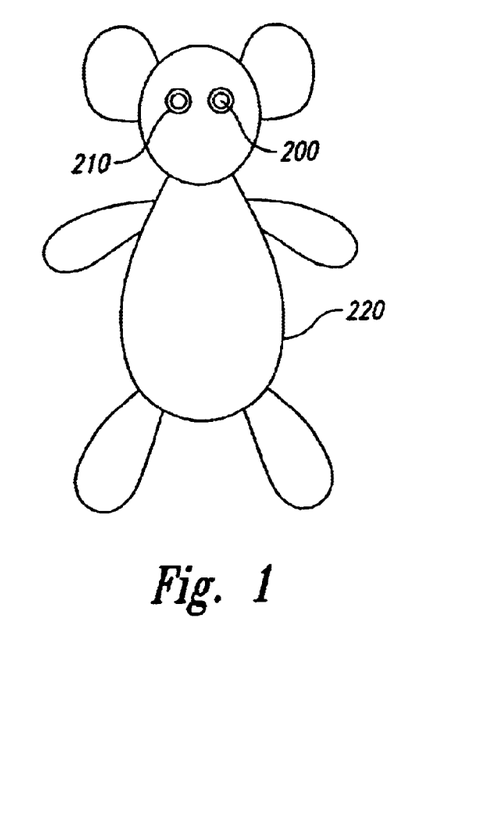
FIG. 1 is a schematic view of a product marked by incorporating quantum dots into a plastic part.

In accordance with one embodiment of the invention, fluorescence properties of quantum dots are used to provide a means for storing information on a surface or in a substance, thereby distinguishing valid products or documents from invalid products or documents. For example, as shown in FIG. 1, quantum dots 200 are incorporated into eyes 210 made from a suitable material such as plastic. The eyes 210 allow authorized products, such as a teddy bear 220, to be distinguished from unauthorized products in accordance with various embodiments of the invention described further below.

Figure 2:
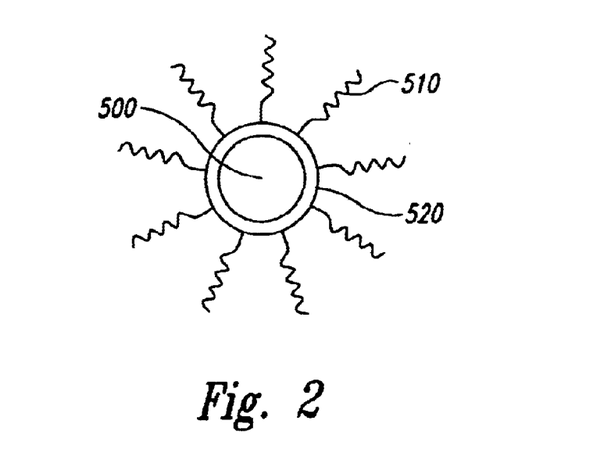
FIG. 2 is a schematic view representing a quantum dot with a capping layer and a further layer of organic molecules, with the organic molecules serving the function of specifically binding the quantum dot to a complementary organic molecule or else to a suitable organic molecule in the presence of light of a particular wavelength.

The use of quantum dots in accordance with various embodiments of the invention are illustrated in the examples explained below. As shown in FIG. 2, a quantum-dot tagged UV-curable ink for anticounterfeit/security application may be made using CdSe quantum dots 500 surrounded by a cap 520 of ZnSe. The ZnSe-capped CdSe quantum dots are prepared by known methods, and have a distinctive distribution of sizes and optical properties of light 510 emitted by the dots. For example, centrifugation can be employed to separate quantum dots according to size due to their size-dependent precipitation rates. Alternatively, different conditions may be used during the growth of different batches of quantum dots to bias their size, then batches may be selectively mixed together to prepare a mixture having a particular size distribution.

Figure 3:
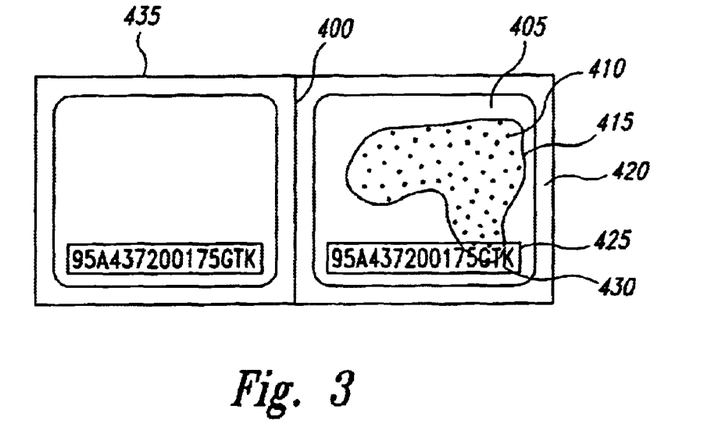
FIG. 3 is a plan view of security labels having a peel-off backing, a pressure-sensitive adhesive coating, a paper substrate printed with fluorescent quantum dot ink, and a transparent hologram with a "window" through which a character string is printed onto the paper substrate.

As illustrated in FIG. 3, a quantity of the prepared mixture of quantum dots 410 may be suspended in a transparent UV-curable resin by stirring for a suitable period, such as four hours, to make a fluorescent UV-curable ink 415. Many UV-curable resins and inks are commercially available from manufacturers in the U.S. and Europe. The quantity of quantum dots in the ink may be high or low. This ink is printed in a pattern onto a paper stock bearing an adhesive coating and peel-off paper backing 420, and cured by exposure to ultraviolet light. The printed paper is then die-cut to make rolls of self-adhesive labels 435.

Figure 4:
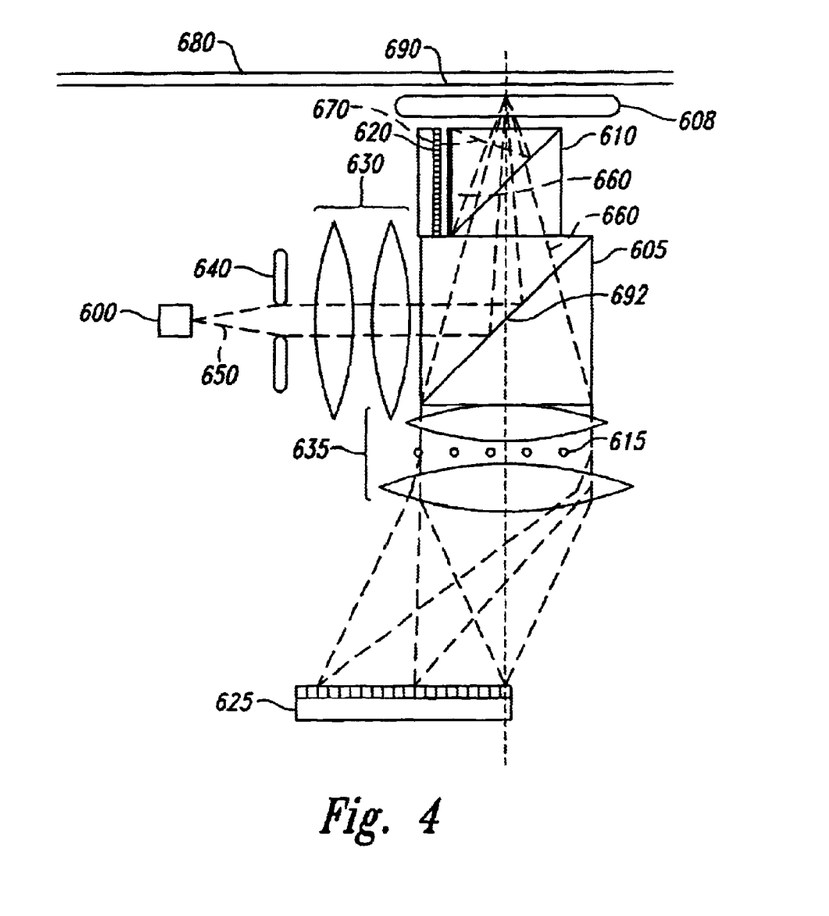
FIG. 4 is a schematic diagram of the optical module of a device for reading security markings in the form of holograms and/or fluorescent patterns having distinctive emission spectra or fluorescence lifetimes, such as those of quantum dots.

The label 435 may be read using a reader, which is illustrated in FIG. 4. The reader consists of an optical system that illuminates a selected region on a label with light of a suitable wavelength, such as 514-nm light for example. The light is used to read a region of a label 690 printed with the quantum-dot tagged ink 415. The reader gathers emitted fluorescence 660 from the illuminated label and analyzes its spectral and temporal properties. A lens system 635 focuses the fluorescent light to a point, and a diffraction grating 615 spreads the fluorescent light into its spectrum on a line array 625 of photodetectors. Electronic circuits analyze the temporal behavior of the fluorescence by modulating the illumination light and comparing the modulation of the illumination light to the resulting modulation of the emitted fluorescence.

Figure 5:
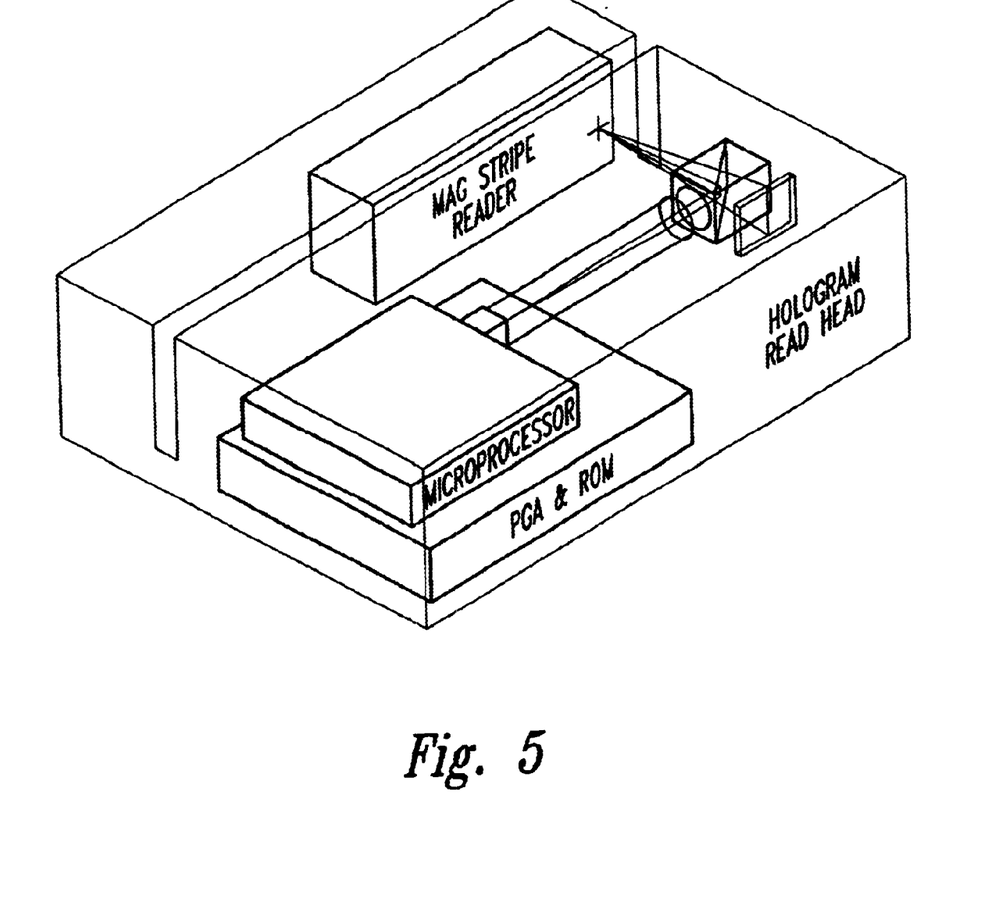
FIG. 5 is a see-through schematic view of a combined reader of holograms and fluorescent quantum dots on printed cards.

The reader shown in FIG. 4 may be combined with readers using other technology, such as a magnetic stripe reader, as illustrated in FIG. 5.

Figure 6:
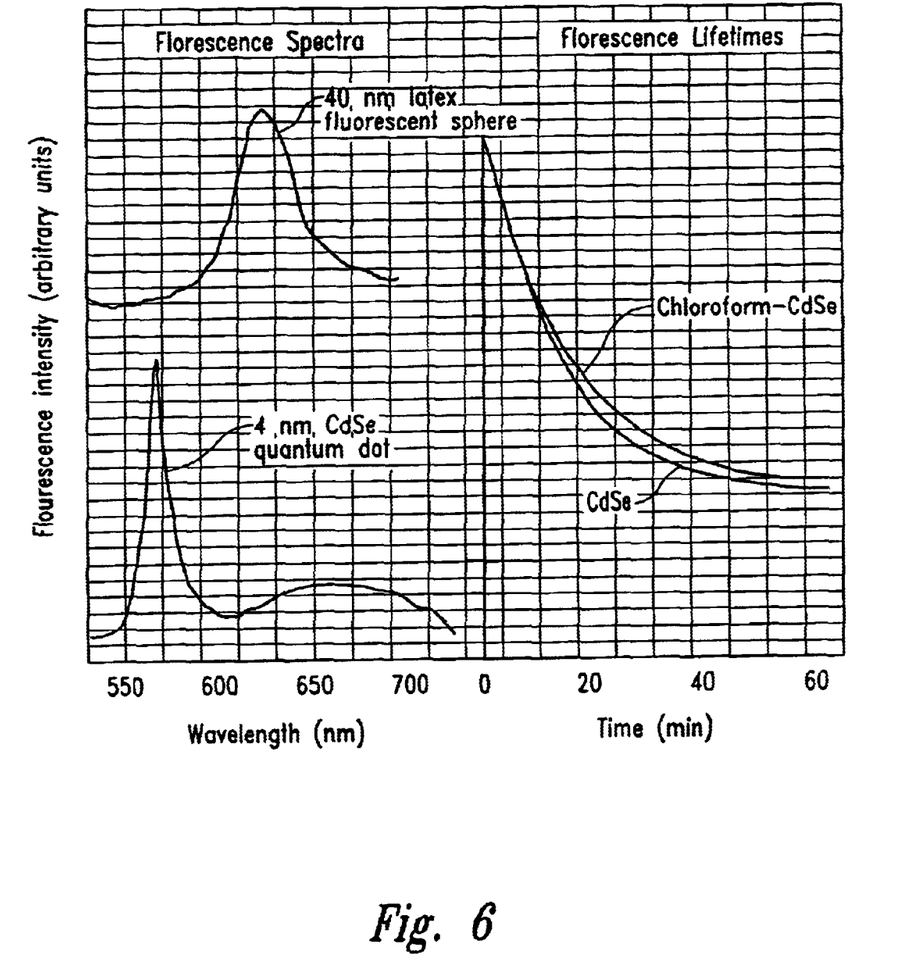
FIG. 6 are graphs showing the differences between quantum dot fluorescence and the fluorescence of typical organic dyes.

Time-resolved fluorescence can be measured by applying a short pulse of excitation light to a sample and observing the emitted fluorescent light intensity over a period of hundreds of nanoseconds. In this context, "short" means short compared to the fluorescence lifetime. Most fluorescent substances emit light only for a few nanoseconds following excitation, but ZnS-capped 520 Cd—Se 500 quantum dots typically emit light for hundreds of nanoseconds following excitation, as illustrated on the right hand side of FIG. 6. The left hand side of FIG. 6 shows the differences between quantum dot fluorescence and the fluorescence of typical organic dyes. An alternative approach to measuring time-resolved fluorescence is to modulate the excitation light at one or more frequencies (e.g., kHz to MHz) and observe the phase relationship between the excitation light modulation and the modulation of the emitted fluorescence light. Either method can clearly distinguish between quantum dot fluorescence and organic dye fluorescence.

By observing the spatially spread spectrum of fluorescence, quantum dots may be distinguished from other kinds of fluorophores by the bandwidth of their fluorescence. The combination of spectral and temporal analysis of fluorescence unambiguously distinguishes between quantum dots and any other fluorophores that might be used by a counterfeiter in an attempt to achieve the same fluorescence properties. The combination of spectral and temporal fluorescence properties may be referred to as the fluorescence signature.

The reader illustrated in FIG. 4 reads the fluorescence signature of each of a series of small spots on the label as the label is moved through the reader. If the quantum dots are present in high concentration so that each spot contains a representative sample of the quantum dot mixture, every spot will produce the same fluorescence signature, which can only be reproduced by reproducing the mixture of quantum dots. Thus, the fluorescence signature provides evidence of the source of the label.

If the quantum dots are widely separated so that on the average only one or a few quantum dots are present in each spot, each spot will have its own fluorescence signature. The series of fluorescence signatures measured from the series of spots across a label, then, is determined by the random locations of the various quantum dots on the label, and will be unique to each label. The series of fluorescence signatures may be referred to as a "fluorescence pattern."

Because the fluorescence pattern on each label is unique, fluorescence patterns on labels may be read and be entered into a database at point of manufacture or point of application. Then at point of sale or at distribution points, the fluorescence patterns may be read and matched to patterns in the database. If a pattern is detected that is not in the database, it is evidence that a counterfeiter has duplicated the manufacturing process for quantum-dot tagged labels.

Instead of using a database which could require an entire communications network, the labels additionally contain a printed character string containing encrypted information including a representation the fluorescence pattern. For example, the character string may be generated by using the fluorescence pattern as the key in a public-key encryption scheme, and the encrypted information may identify the label printer and the date the information was encrypted and the character string printed on the label. Thus, a reader at the point of sale of the labeled product can read both the fluorescence pattern and the character string, decrypt the character string, and extract the encrypted information, thereby verifying the validity of the label and the product.

Figure 7:
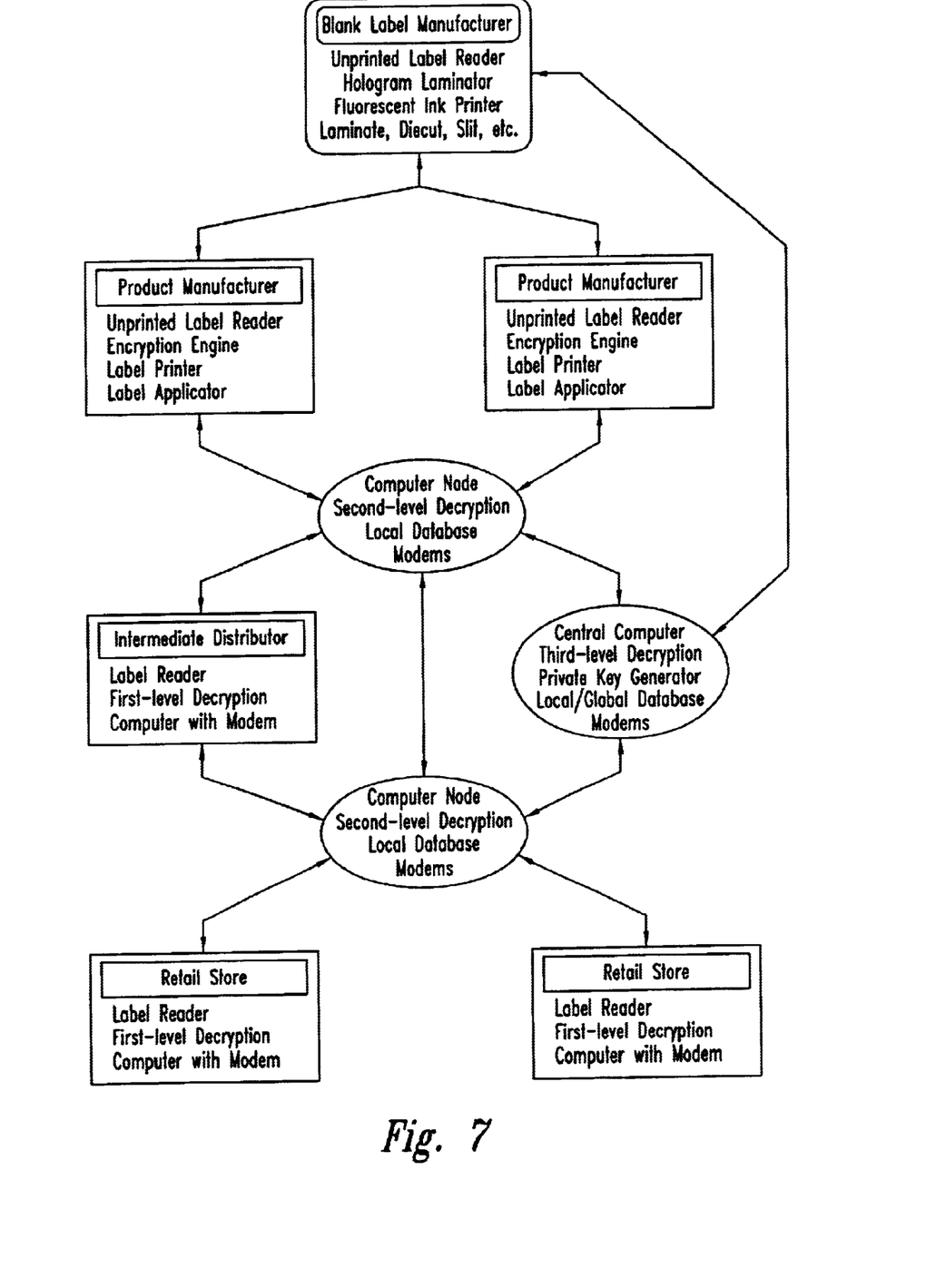
FIG. 7 is a flow chart of a system for preventing and/or detecting counterfeits of products by means of a security marking reader, a character string printer, a reader of character strings and security markings, and a communications network.

A system for preventing and/or detecting counterfeits of products by means of a security marking reader is illustrated in FIG. 7. The system includes use of a character string printer (not shown), a reader of character strings and security markings (not shown), and a communications network (not shown).

A mixture of quantum dots may be used as a taggant in explosives. In accordance with this embodiment of the invention, quantum dots having a predetermined size distribution may be added to explosives or other substances at the time of manufacture, thereby labeling the substances according to their time and/or place of manufacture.

In accordance with another embodiment of the invention, quantum dots may be placed on a surface to provide information storage. More specifically, batches of quantum dots, with each batch having a distinct small range of dot sizes, are prepared. Each batch of dots is coated with a photo-activatable binding agent, such as dichromated gelatin. An optical system focuses a laser beam to a very small spot, on the order of a micron in diameter, on a surface that is coated with a first batch of dots. The laser beam is scanned over the surface, turned on and off according to position, thereby binding the first dots where the laser beam was turned on. The surface is rinsed off to remove un-bound quantum dots. Then the surface is coated with a second batch of dots and the process is repeated with a different illumination pattern. Subsequent dot batches and illumination patterns provide further binding of different quantum dots sizes, each in its own distinct pattern.

Because the typical size of a quantum dot is less than four nanometers, a surface can hold as many as 6,250,000 quantum dots per square micron, or 6,250,000,000,000 dots per square centimeter. The quantum dots can be prepared in 20 or more distinct sizes either by precise control of growth time and conditions, or by physical separation methods, yielding a total storage of approximately 100,000,000,000,000 bits per square centimeter as compared to contemporary high-density magnetic storage density on the order of 50,000,000 bits per square centimeter.

Reading the information stored thus in the label can be done with a near-field scanning optical probe having a tip size comparable to the size of a quantum dot.

In order to mass-produce replicas of a quantum dot pattern, a master pattern may be prepared by generating the original quantum dot pattern using quantum dots tagged with DNA sequences unique to the size of the dot. Then, after the master pattern is prepared, a replica may be prepared by the following steps:

1. flood the master pattern with quantum dots coated with thiol-erminated DNA complementary to the DNA on the corresponding dots on the master pattern and allow complementary DNA strands to hybridize.
2. rinse the surplus quantum dots off the master
3. prepare a flat glass plate by coating it with gold by vapor deposition, immersing the plate in a one millimolar solution of 11-mercaptoundecanoic acid (MUA) in ethanol for 18 hours to bind a monolayer of MUA to the gold, then adsorbing poly L-lysine to the MUA monolayer in the presence of NaHCO3, then adding sulfosuccinimidyl-4-(N-maleimidomethyl) cyclohexane-1-carboxylate (SSMCC) to the MUA monolayer. The SSMCC reacts with the lysine residues to generate a surface containing reactive maleimide groups.
4. Press the treated gold surface of the plate against the master pattern, thereby bringing a portion of the thiol-terminated DNA on each quantum dot in contact with the reactive maleimide groups. Keep the master pattern and plate pressed together for 12 hours to allow the thiol-terminated DNA to react with and bind to the maleimide groups.
5. Warn the assembly to disassociate the complementary DNA strands, and separate the glass plate from the master. The glass plate then bears a pattern of quantum dots which is the mirror image of the master pattern.

The replica contains the same (or corresponding) quantum dots in the same pattern as the master. Multiple replicas may be made by the same procedure from a single master, and replicas may be made from replicas, thereby producing a large number of replicas from a single master.

RNA has specific binding properties similar to DNA, as do antibody/antigen combinations; and these or any other specific binding means may be used in essentially the same way.

The fluorescent ink described herein can be applied by any standard printing method suitable for the carrier in which the quantum dots are suspended. One preferred method of printing is by ink jet printing, because it permits printing variable information in the form of distinct types of quantum dots in different printed dots.

The methods described herein may be modified and adjusted in various ways. For example:

the composition and structure of the quantum dots, such as the choice of material and the presence or absence of layers of different material, may be varied to produce different absorption and fluorescence behavior;

the photo-activatable binding agent may be selected from any of a large number of knows photo-activatable binding agents;

the density of quantum dots on a label or in a substance may be varied over any range of detectable densities;

excitation light may be varied between the longest wavelength and the shortest wavelength capable of exciting the particular quantum dots used;

the pattern of quantum dots on a label may be predetermined, periodic, quasiperiodic or random;

any device capable of detecting the fluorescence spectrum and/or time-resolved fluorescence of the quantum dots may be used;

any fluorescent inks, particles, fibers or other structures or substances may be used in an opaque reflective hologram or in or under a transparent hologram;

the quantum dots may be combined with any other optically, electromagnetically, chemically, acoustically or mechanically detectable features to provide further enhanced anticounterfeiting security;

any substance or structure with binding specificity may be used in the replication process of quantum dot patterns;

quantum dot patterns or distributions may be read using a near-field optical scanning probe microscope, a conventional microscope, a fluorescence microscope, an epifluorescence microscope, a spectrofluorometer, or any other means capable of distinguishing the distribution or arrangement, locations or properties of quantum dots individually or in assortments;

time-resolved fluorescence may be detected using excitation by brief pulses, square-wave pulses, sinusoidally modulated light or adaptively modulated light;

excitation may be accomplished by laser light, incandescent light, metal vapor discharge light, or any other light and light source capable of exciting fluorescence in quantum dots;

the photoconductivity or absorption spectrum of semiconductor quantum dots may be employed in detecting the presence and properties of quantum dots;

labels do not require a hologram in the context of this invention; they can be simply printed with quantum-dot inks, a combination of quantum-dot inks and other inks, printed on paper or other substrates containing quantum dots, or overcoated or overlaminated with layers containing quantum dots.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. An anti-counterfeit device comprising quantum dots applied to a substrate in a pattern, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter.

2. An anti-counterfeit device comprising quantum dots applied to a surface in a random pattern, the quantum dots having sizes, compositions and structures which at least partially determine the fluorescence properties of the quantum dots such that the pattern of quantum dots produces fluorescence signatures upon illumination with excitation light and which vary randomly from point to point on the surface, the fluorescence signatures having a relatively narrow emission spectrum, a relatively long fluorescence lifetime, and a fluorescence spectrum peak correlated to quantum dot diameter, further comprising a hardened liquid carrier in which the quantum dots are embedded, the hardened liquid carrier coating at least a portion of the substrate.

3. A data recording medium comprising quantum dots having random sizes arrayed in regions on a surface, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter, the quantum dots being selectively altered such that information is encoded in the distribution or selection of properties of the quantum dots in each of the regions.

4. A data recording medium comprising quantum dots bound to selected regions on a surface, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter such that information is encoded in the distribution or selection of properties of the quantum dots in each region.

5. The data recording medium of claim 4 wherein the quantum dote are bound to selected regions on a surface by optically controlled chemical or physically controlled binding.

6. An anticounterfeit/security system comprising:
a document bearing quantum dots in a detectable arrangement, said quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter; and
a reader detecting the presence and arrangement of at least a portion of the quantum dots on the document based on the signatures.

7. An anticounterfeit/security system comprising:
means for applying quantum dots to a document in a detectable arrangement, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter;
means for detecting the presence and arrangement of the quantum dots on at least a portion of the document based on the signature; and
means for comparing the arrangement to a reference.

8. A product having enhanced counterfeit resistance, comprising quantum dots deposited on a surface of the product, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter, the product further having an additional counterfeit-resistant feature located on the surface of the product.

9. A label system for impeding counterfeiting, comprising:
a substrate defining a label base having one side for attachment to a product or packaging therefore and an opposite product identification side;
quantum dots placed on the product identification side of the substrate in a detectable arrangement, the quantum dots having sizes, compositions and structures which at least partially determine the fluorescence properties of the quantum dots such that the pattern of quantum dots produces fluorescence signatures upon illumination with excitation light, the fluorescence signatures having a relatively narrow emission spectrum, a relatively long fluorescence lifetime, and a fluorescence spectrum peak correlated to quantum dot diameter;
means for detecting the properties or locations of the quantum dots based on the signature;
means for applying visible indicia on the product identification side, the indicia incorporating an encrypted message derived from the properties or locations; and
means for reading the indicia, detecting the properties and the locations and decrypting at least a portion of the indicia to determine the inclusion or non-inclusion of the message.

* * * * *

UNITED STATES PATENT AND TRADEMARK OFFICE
CERTIFICATE OF CORRECTION

PATENT NO. : 6,692,031 B2
DATED : February 17, 2004
INVENTOR(S) : Stephen P. McGrew It is certified that error appears in the above-identified patent and that said Letters Patent is hereby corrected as shown below:

Column 1,
Line 5, reads "No. 09/224.938, filed Dec 31, 1998 now abandoned." should read
-- No. 09/224,938, filed Dec. 31, 1998, now abandoned. --
Line 59, reads "in he publication" should read -- the publication --

Column 2,
Line 2, "nanoseconds." should read -- nanoseconds; --
Line 4, reads "dot diameter" should read -- dot diameter. --
Line 14, reads "quantum dots arrays" should read -- quantum dot arrays --

Column 4,
Line 52, reads "a representation the" should read -- a representation of the --
Line 44, reads "thiol-erminated DNA" should read--thiol-terminated DNA --

Column 6,
Line 26, reads "large number of knows" should read -- large number of known --

Column 7,
Line 60, reads "quantum dote are bound" should read -- quantum dots are bound --

Signed and Sealed this

Nineteenth Day of October, 2004

JON W. DUDAS
*Director of the United States Patent and Trademark Office*